US007050944B2

(12) United States Patent
Evans (10) Patent No.: US 7,050,944 B2
(45) Date of Patent: May 23, 2006

(54) FCC CATALYST INJECTION SYSTEM HAVING LOCAL DATA ACCESS

(75) Inventor: Martin Evans, Tolland, CT (US)

(73) Assignee: Intercat Equipment, Inc., Manasquan, NJ (US)

( * ) Notice: Subject to any disclaimer, the term of this patent is extended or adjusted under 35 U.S.C. 154(b) by 342 days.

(21) Appl. No.: 10/304,670

(22) Filed: Nov. 26, 2002

(65) Prior Publication Data

US 2004/0102929 A1 May 27, 2004

(51) Int. Cl.
*G06F 7/04* (2006.01)

(52) U.S. Cl. ............... 702/188; 702/30; 702/182; 702/183

(58) Field of Classification Search ............ 702/182, 702/188, 22, 23, 30, 50, 100, 183; 422/22; 423/203; 585/240
See application file for complete search history.

(56) References Cited

U.S. PATENT DOCUMENTS

| | | | | |
|---|---|---|---|---|
| 4,054,784 | A | | 10/1977 | Ricciardi et al. ............ 700/240 |
| RE32,101 | E | | 4/1986 | Ricciardi et al. .............. 222/56 |
| 4,927,523 | A | | 5/1990 | Donnelly ............... 208/120.01 |
| 4,927,526 | A | | 5/1990 | Anderson et al. ........... 208/152 |
| 4,994,173 | A | | 2/1991 | Tai-Sheng et al. .......... 208/152 |
| 5,081,600 | A | | 1/1992 | Tump ......................... 700/240 |
| 5,260,880 | A | | 11/1993 | Tump ......................... 700/240 |
| 5,357,306 | A | | 10/1994 | Skye et al. ................. 396/630 |
| 5,389,236 | A | | 2/1995 | Bartholic et al. ........... 208/152 |
| 5,785,934 | A | * | 7/1998 | Jacobs et al. ................. 422/29 |
| 5,810,045 | A | | 9/1998 | Evans ......................... 137/312 |
| 6,013,158 | A | * | 1/2000 | Wootten ....................... 202/99 |
| 6,358,401 | B1 | | 3/2002 | Evans ......................... 208/152 |
| 2003/0089426 | A1 | * | 5/2003 | Poor et al. .................. 148/216 |

FOREIGN PATENT DOCUMENTS

| | | |
|---|---|---|
| EP | 0 408 606 | 9/1993 |
| WO | WO 89/07487 | 8/1989 |

OTHER PUBLICATIONS

Federal Corporation, Honeywell Leader Line Controllers, Programmers, Recorders and software, Nov. 20, 2003, Honeywell Industrial, pp. 1–8.*

IEEE Building a Perfromance Model of Streaming Media Applications in Utility Data Center (UDC) Environment, May 12–15, 2003, pp. 1.*

Richardson Electronics—Engineered Solutions, RF & Wireless Communications, Honeywell Wireless Transceiver, Jun. 3–4, 2002, pp. 1–3.*

Honeywell, Honeywell VCSEL Optical Products, Nov. 7, 2002, pp. 1–9.*

(Continued)

*Primary Examiner*—Marc S. Hoff
*Assistant Examiner*—Felix Suarez
(74) *Attorney, Agent, or Firm*—Patterson & Sheridan, LLP; Keith Taboada, Esq.

(57) ABSTRACT

A system and method for injecting catalyst into a fluid catalyst cracking (FCC) unit is provided. In one embodiment, a system for injecting catalyst into a FCC unit includes a catalyst injection apparatus coupled to a controller. The controller is housed in an enclosure suitable for hazardous service and has a communication port for communicating information derived information regarding activity of the catalyst injection apparatus to a device remote from the enclosure while the enclosure is sealed. In another embodiment, a method for injecting catalyst into a FCC unit includes the steps of dispensing catalyst from an injection system into a FCC unit, storing a record of system activity in a memory device disposed in an enclosure suitable of hazardous duty, and accessing the stored record without exposing an interior of the enclosure to an environment surrounding the enclosure.

35 Claims, 5 Drawing Sheets

OTHER PUBLICATIONS

Everlasting Valve Company, www.everlastingvalveco.com, printed Feb. 6, 2003.

ADPI C–Engine, www.adpi.com/C–Engine.htm, printed Nov. 15, 2002.

"IMS to Control Room", Dwg S–29, Sheet 1, Intercat, Savannah, Georgia, Nov. 26, 2001.

"Corn Starch Batching System," Corn Startch & Liquids Blending System for Atochem–Buffalo, NY (Job #1193D), TOPDOC–AB5 by Tele–Denken Resources, Inc. 2.25, created Jun. 22, 1992, pp. 42–51, 31–34, 64, and 68.

* cited by examiner

FCC CATALYST INJECTION SYSTEM HAVING LOCAL DATA ACCESS

BACKGROUND OF THE INVENTION

1. Field of the Invention

Embodiments of the invention generally relate to a fluid catalytic cracking catalyst injection system.

2. Description of the Related Art

Figure 1:
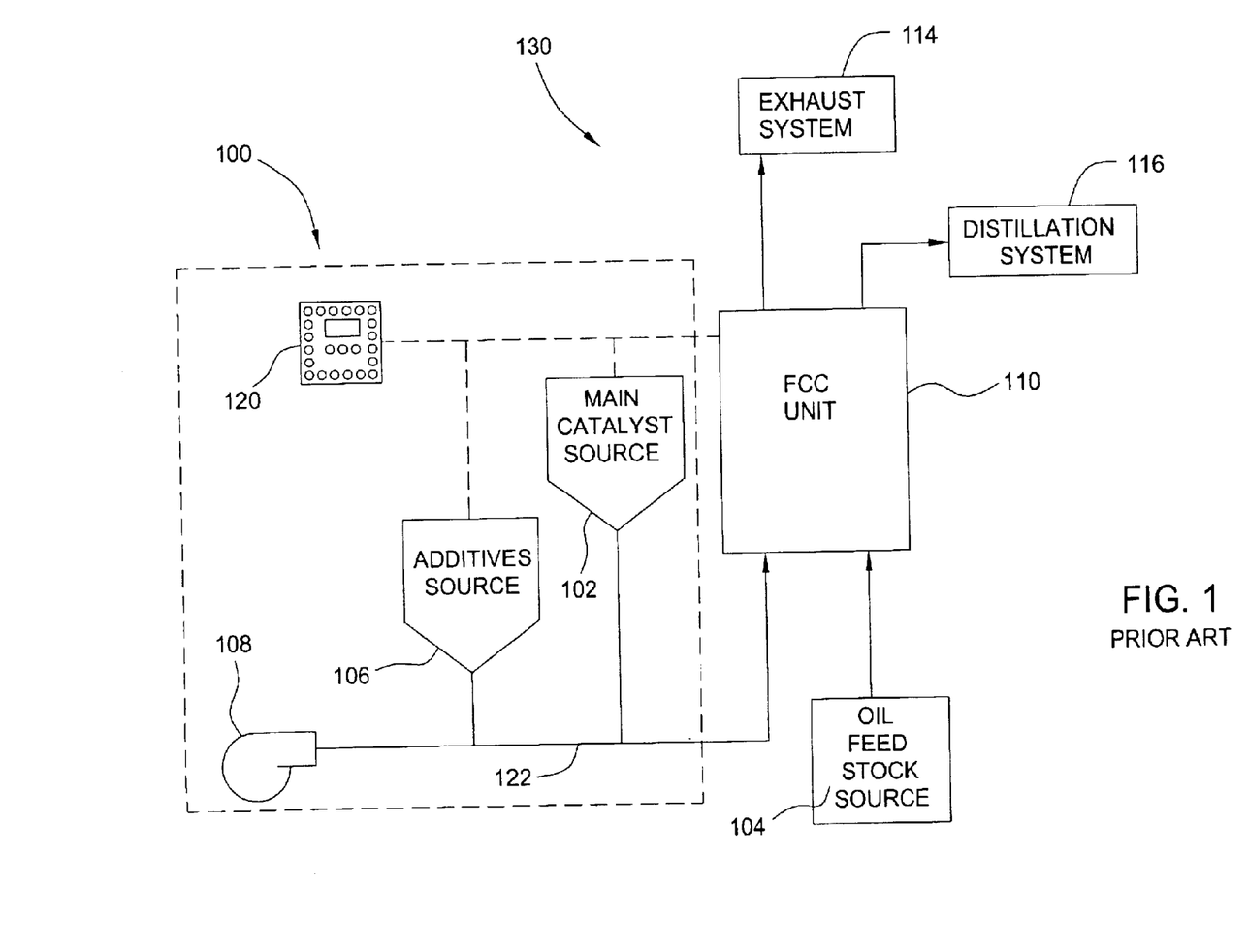
FIG. 1 is a simplified schematic view of a conventional fluid catalytic cracking system.

FIG. 1 is a simplified schematic of a conventional fluid catalytic cracking system 130. The fluid catalytic cracking system 130 generally includes a fluid catalytic cracking (FCC) unit 110 coupled to a catalyst injection system 100, an oil feed stock source 104, an exhaust system 114 and a distillation system 116. One or more catalysts from the catalyst injection system 100 and oil from the oil feed stock source 104 are delivered to the FCC unit 110, The oil and catalysts are combined to produce an oil vapor that is collected and separated into various petrochemical products in the distillation system 116. The exhaust system 114 is coupled to the FCC unit 110 and is adapted to control and/or monitor the exhausted byproducts of the fluid cracking process.

The catalyst injection system 100 includes a main catalyst source 102 and one or more additive sources 106. The main catalyst source 102 and the additive source 106 are coupled to the FCC unit 110 by a process line 122. A fluid source, such as a blower or air compressor 108, is coupled to the process line 122 and provides pressurized fluid, such as air, that is utilized to carry the various powdered catalysts from the sources 102, 106 through the process line 122 and into the FCC unit 110.

A controller 120 is utilized to control the amounts of catalysts and additives utilized in the FCC unit 110. Typically, different additives are provided to the FCC unit 110 to control the ratio of product types recovered in the distillation system 116 (i.e., for example, more LPG than gasoline) and to control the composition of emissions passing through the exhaust system 114, among other process control attributes. As the controller 120 is generally positioned proximate the catalyst sources 106, 102 and the FCC unit 110, the controller 120 is typically housed in an explosion-proof enclosure to prevent spark ignition of gases which may potentially exist on the exterior of the enclosure in a petroleum processing environment.

Due to the danger of spark ignition near the FCC system, the enclosures utilized to house the controller are configured to meet applicable government regulations, industrial standards and/or processor standards. For example, in the United States, the controller must be housed in Class I, Division 1 explosion-proof enclosure as described in Section 500 of the National Electric Code (NEC).

Explosion-proof enclosures meeting such safety standards typically include a cast metallic body having a lid bolted thereto utilizing a plurality of fasteners. Thus, access to the contents of the enclosure, e.g., a controller, requires a time-consuming process of removing a plurality of bolts. Moreover, as the controller is now exposed to the potentially hazardous environment, high-level authorization from plant operations management is typically required as certain processing activities must be stopped to minimize the presence of hazardous gases. In addition, special safety precautions are frequently required when opening the enclosure, such as monitoring the air in the region surrounding the enclosure for flammable gas content, provision of extra fire extinguishing equipment, covering or closing off of gratings over drainage channels, among other safety measures. Thus, servicing or obtaining items within the housing, such as a disk containing historical information regarding catalyst injection events from the controller, is both difficult and time consuming, and may require an interruption in processing activities.

Therefore, there is a need for an improved FCC injection system.

SUMMARY OF THE INVENTION

The invention is a system and method for injecting catalyst into a fluid catalyst cracking (FCC) unit. In one embodiment, a system for injecting catalyst into a FCC unit includes a catalyst injection apparatus coupled to a controller. The controller is housed in an enclosure suitable for hazardous service and has a communication port for communicating information derived from activity of the catalyst injection system to a device remote from the enclosure.

Another embodiment of the invention comprises a method for injecting catalyst from a catalyst injection system into a FCC unit that includes the steps of dispensing catalyst into a FCC unit, storing a record indicative system activity disposed in an enclosure suitable for hazardous duty, and accessing the stored record without exposing an interior of the enclosure to an environment surrounding the enclosure.

DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION

Figure 2:
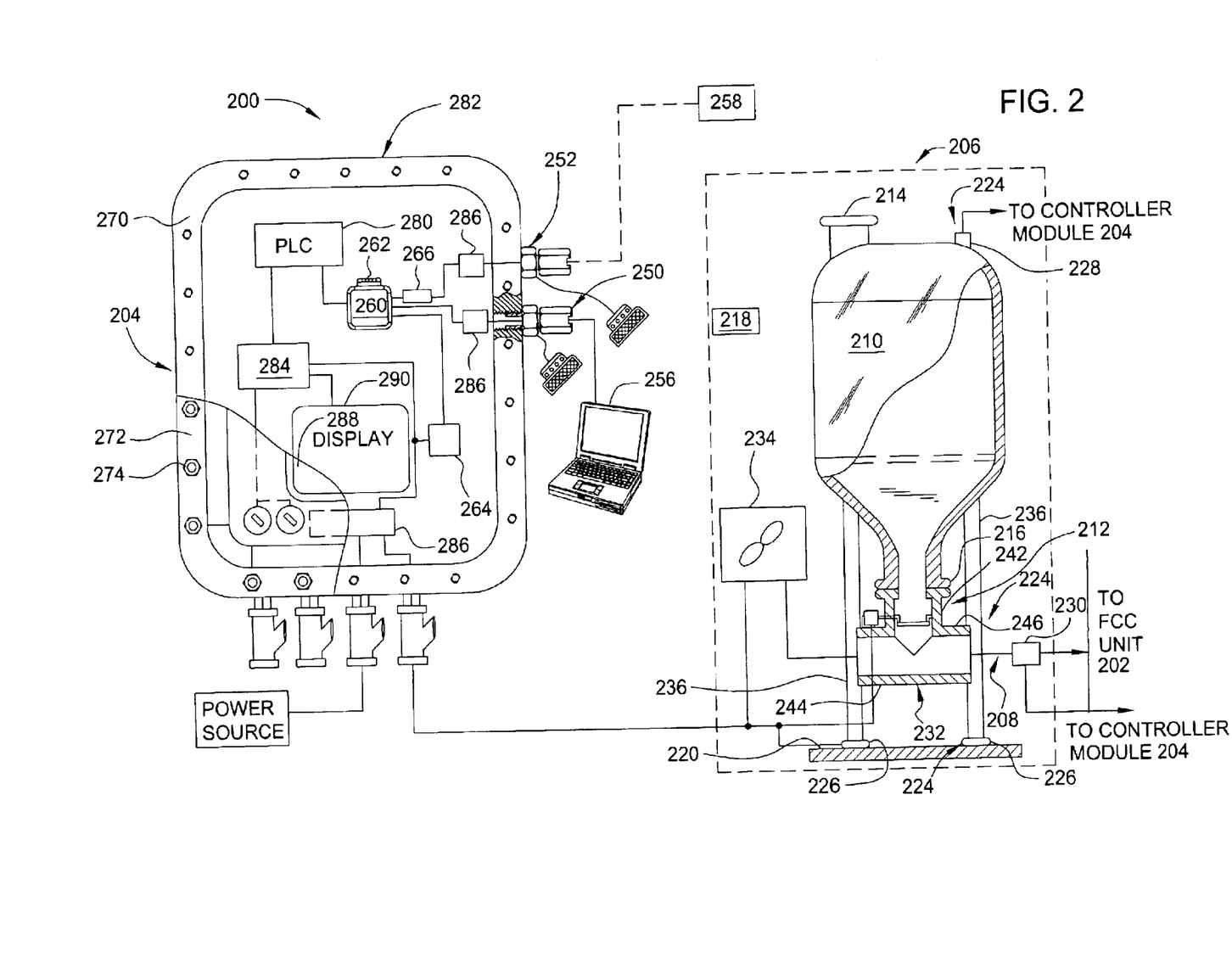
FIG. 2 is a simplified schematic diagram of a fluid catalytic cracking system illustrating an injection system depicting a first embodiment of a control module configured to provide local data access in accordance with one embodiment of the present invention.

FIG. 2 depicts one embodiment of a fluid catalytic cracking (FCC) system 200 configured to facilitate local data access of information obtained by a control module 204 coupled to the system 200. The FCC system 200 also includes a fluid catalytic cracking (FCC) unit 202 coupled to a catalyst injection system 206. The FCC unit 202 is adapted to promote catalytic cracking of petroleum feed stock and may configured in a conventional manner. The injection system 206 is coupled to the FCC unit 202 and is configured to inject one or more catalysts into the FCC unit 202 to control processing attributes such as the ratio of products recovered in a distiller of the FCC unit 202 and/or to control the emissions from the FCC unit 202. The control module 204 is coupled to the injection system 206 to control the rates and/or amounts of catalyst provided to the FCC unit 202 by the injection system 206.

In one embodiment, the injection system 206 includes a storage vessel 210 coupled to a metering device 212. The metering device 212 is typically coupled to the control module 204 so that an amount of catalyst delivered to the FCC unit 202 may be monitored or metered. Exemplary injection systems that may be adapted to benefit from the invention are described in U.S. Pat. No. 5,389,236, issued Feb. 14, 1995, and in U.S. Pat. No. 6,358,401, issued Mar. 19, 2002, both of which are hereby incorporated by reference in their entireties. Other catalyst injection systems that may be adapted to benefit from the invention are available from Intercat, Inc., headquartered in Sea Girt, N.J., USA.

The storage vessel 210 is typically a metal container having a fill port 214 and a discharge port 216. Typically, the discharge port 216 is positioned at or near a bottom of the storage vessel 210. The storage vessel 210 is coupled to a pressure control apparatus 218 that controls the pressure within the storage vessel 210. The pressure control apparatus 218 generally pressurizes the storage vessel 210 to about 5 to about 60 pounds per square inch (about 0.35 to about 4.2 kg/cm$^2$) during dispensing operations. The apparatus 218 intermittently vents the storage vessel 210 to about atmospheric pressure to accommodate recharging the vessel 210 with catalyst.

A metering device 212 is coupled to the discharge port 216 to control the amount of catalyst injected from the storage vessel 210 to the FCC unit 202. The metering device 212 may be a shut-off valve, a rotary valve, a mass flow controller, a shot pot, a flow sensor, a positive displacement pump or other devices suitable for regulating the amount of catalyst dispensed from the storage vessel 210 for delivery to the FCC unit 202. The metering device 212 may determine the amount of catalyst by weight, volume, timed dispense or by other manners. Depending on the catalyst requirements of the system 100, the metering device 212 is typically configured to provide about 5 to about 4000 pounds per day of additive-type catalysts (process control catalyst) or may be configured to provide about 1 to about 20 tons per day of main catalyst. The metering device 212 typically delivers catalysts over the course of a planned production cycle, typically 24 hours, in multiple shots of predetermined amounts spaced over the production cycle. However, catalysts may also be added in an "as needed" basis.

In the embodiment depicted in FIG. 2, the metering device 212 is a control valve 232 that regulates the amount of catalyst delivered from the storage vessel 210 to the FCC unit 202 by a timed actuation. The control valve 232 generally includes a first port 242 that is coupled to the discharge port 216 of the storage vessel 210. A second port 244 of the control valve 232 is coupled to a portion of the delivery line 208 leading from a fluid source 234 such as a blower or compressor. A third port 246 of the control valve 232 is coupled to a portion of the delivery line 208 leading to the FCC unit 202. When actuated to an open position, the control valve 232 allows catalyst to flow from the storage vessel 210 towards the third port 246, where fluid provided from the fluid source 234, moving from the second port 244 towards the third port 246 entrains and carries the catalyst to the FCC unit 202. In one embodiment, the fluid source 234 provides air at about 60 psi (about 4.2 kg/cm$^2$).

Figure 3:
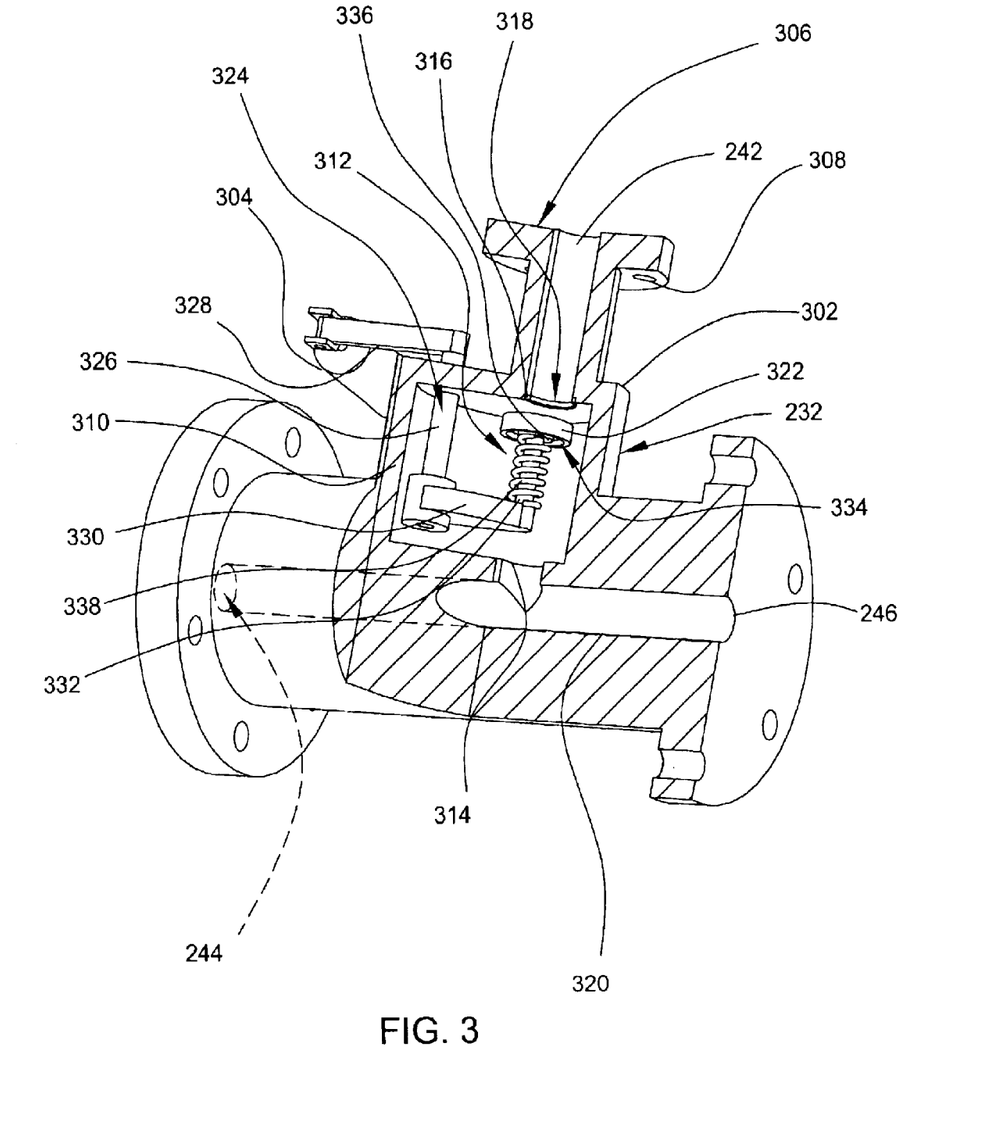
FIG. 3 is a sectional, isometric view of one embodiment of a control valve used in conjunction with the present invention.

FIG. 3 is a sectional, isometric view of one embodiment of the control valve 232. The control valve 232 includes a valve body 302 and an actuator 304. The valve body 302 includes a first flange 306 having the first port 242 formed therethrough. The first flange 306 also includes a plurality of mounting holes 308 to facilitate coupling the valve body 302 to the discharge port 216 of the storage vessel 210 shown in FIG. 2. The first flange 306 is coupled to a housing 310. The housing 310 of the valve body 302 defines a cavity 312 that is coupled to the first port 242 by a valve seat 316 disposed at one end and a first passage 314 coupled to a second passage 320 (shown in partially in phantom) that couples the second and third ports 244, 246 at a second end. The valve seat 316 has an orifice 318 formed therethrough that fluidly couples the cavity 312 to the discharge port 216 of the storage vessel 210 (shown in FIG. 2). The orifice 318 is typically between about $ to about 1¾ inches in diameter.

The orifice 318 of the control valve 232 is opened and closed by selectively moving a shear disk 322 laterally across the seat 316. The shear disk 322 generally has a lapped metallic upper sealing surface that seals against the valve seat 316, which is typically also metallic. As the shear disk 322 is disposed on the downstream side of the valve seat 316, any backpressure generated in the FCC unit 202 will not inadvertently open the valve 232.

An actuator assembly 324 couples the shear disk 322 to the actuator 304 that controls the open and closed state of the control valve 232. The actuator assembly 324 includes a shaft 326 that extends through the housing 310. A first arm 328 of the actuator assembly 324 is coupled to an end of the shaft 326 disposed on the outside of the housing 310. A second arm 330 of the actuator assembly 324 is coupled to an end of the shaft 326 disposed in the cavity 312 of the housing 310. A pin 332 extends from the second arm 330 and engages the shear disk 322. A recess 334 formed in a lower surface of the shear disk 322 receives the pin 332 and prevents the pin 332 and shear disk 322 from becoming disengaged as the pin 332 urges the shear disk 322 laterally over or clear of the orifice 318.

An annular bushing 336 residing in the recess 334 circumscribes the end of the pin 332. The bushing 336 is retained by the pin 332 and can move axially along the pin 332. A diameter of the bushing 336 is generally less than a diameter of the recess 334 to that the shear disk 322 may rotate eccentrically round the bushing 336 and the pin 332 as the shear disk 322 is moved laterally.

A spring 338 is disposed around the pin 332 between the second arm 330 and the bushing 336. The spring 338 biases the bushing 336 and the shear disk 322 away from the second arm 330 and against the valve seat 316 so that the shear disk 322 seals the orifice 318 when the shear disk 322 is positioned over the valve seat 316.

As depicted in FIG. 3, the actuator 304 is coupled to the first arm 328 and rotates the shaft 326 to move the shear disk 322 between positions that open and close the orifice 318. As the pin and bushing 332, 336 have a diameter smaller than the recess 324 formed in the shear disk 322, the shear disk 322 precesses about the shaft 326 as the control valve 232 is opened and closed (i.e., the shear disk 322 rotates eccentricity about the pin 332 while additionally rotating about the shaft 326). This motion of the shear disk 322 over the valve seat 316 provides a self-lapping, seat cleaning action that prevents the catalyst from grooving the sealing surfaces of the shear disk 322 and valve seat 316 that could cause the valve leakage. It has been found that this configuration of valve operation substantially extends the service life of the valve 232. Other control valves may alternatively be utilized.

Referring back to FIG. 2, the injection system 206 may also include one or more sensors 224 for providing a metric suitable for resolving the amount of catalyst passing through the metering device 212 during each injection of catalyst. The sensors 224 may be configured to detect the level (i.e., volume) of catalyst in the storage vessel 210, the weight of catalyst in the storage vessel 210, the rate of catalyst movement through the storage vessel 210, discharge port 216, metering device 212 and/or catalyst delivery line 208 or the like.

In the embodiment depicted in FIG. 2, the sensor 224 is a plurality of load cells 226 adapted to provide a metric indicative of the weight of catalyst in the storage vessel 210. The load cells 226 are respectively coupled to a plurality of legs 236 that supports the storage vessel 210 above a surface 220, such as a concrete pad. Each of the legs 236 has one load cell 226 coupled thereto. The control module 204 receives the outputs of the load cells 226. From sequential data samples obtained from the load cells 226, the control module 204 may resolve the net amount of injected catalyst after each actuation of the metering device 212. Additionally, the net amount of catalyst dispensed over the course of the production cycle may be monitored so that variations in the amount of catalyst dispensed in each individual shot may be compensated for by adjusting the delivery attributes of the metering device 212, for example, changing the open time of the control valve 232 to allow more (or less) catalyst to pass therethrough and into the FCC unit 202.

Alternatively, the sensor 224 may be a level sensor 228 coupled to the storage vessel 210 and adapted to detect a metric indicative of the level of catalyst within the storage vessel 210. The level sensor 228 may be an optical transducer, a capacitance device, a sonic transducer or other device suitable for providing information from which the level or volume of catalyst disposed in the storage vessel 210 may be resolved. By utilizing the sensed differences in the levels of catalyst disposed within the storage vessel 210 between dispenses, the amount of catalyst injected may be resolved for a known storage vessel geometry.

Alternatively, the sensor 224 may be a flow sensor 230 adapted to detect the flow of catalyst through one of the components of the catalyst injection system 206. The flow sensor 230 maybe a contact or non-contact device and may be mounted to the storage vessel 210, the metering device 212 or the catalyst delivery line 208 coupling the storage vessel 210 to the FCC unit 202. In the embodiment depicted in FIG. 2, the flow sensor 230 may be a sonic flow meter or capacitance device adapted to detect the rate of entrained particles (i.e., catalyst) moving through the delivery line 208.

The control module 204 generally includes a controller 280 housed in an enclosure 282 that is suitable for service in hazardous locations. In one embodiment, the enclosure 282 is fabricated in accordance with NEC 500 Division 1, Class 1, or other similar standard.

The enclosure 282 includes a housing 270 having a cover 272 fastened thereto by a plurality of bolts 274. The housing 270 and cover 272 are typically fabricated from cast aluminum and have machined mating services that form a sealed cavity.

The controller 280 may be any suitable logic device for controlling the operation of the catalyst injection system 206. In one embodiment, the controller 280 is a programmable logic controller (PLC), such as those available from GE Fanuc. However, from the disclosure herein, those skilled in the art will realize that other controllers such as microcontrollers, microprocessors, programmable gate arrays, and application specific integrated circuits (ASICs) may be used to perform the controlling functions of the controller 280.

The controller 280 is coupled to various support circuits 284 that provide various signals to the controller 280. These support circuits include, power supplies, clocks, input and output interface circuits and the like. One of the support circuits 284 is coupled to a display 290 that displays process information and/or system status. The display 290 can be viewed through a window 288 disposed in the cover 272 of the enclosure 282. Another one of the support circuits 284 couples the sensors 224 to the controller 280.

All signals to and from the controller 280 and the support circuits 284 that pass to the exterior of the enclosure 282 must pass through an intrinsically safe barrier 286 to prevent power surges that may potentially ignite fumes present in the environment surrounding the enclosure 282. In one embodiment, the intrinsically safe barrier 286 is a Zener diode that substantially prevents voltage spikes from leaving the enclosure 282. The Zener diode is coupled from a conductive path carrying the signal to or from the interior of the enclosure 282 to ground. As such, any voltage spikes that exceed the breakdown voltage of the Zener diode will be shorted to ground and, thus, not leave the enclosure 282.

The controller 280 typically includes or is coupled to a processor 260 that manages data provided by the sensors 224. In one embodiment, the processor 260 is coupled to controller 280 and powered by a power source 264 disposed within the enclosure 282. The processor 260 writes information from the system 100 to a memory device 262. The information recorded in the memory device 262 may include data from the sensors 224 indicative of the amount of catalyst injected into the FCC unit 110, error messages from the controller 280, a record of operator activity, such as refilling the addition system, times of manually interrupting and restarting additions, any additions that are made manually which are in addition to any controlled additions, and an hourly weight record of how much catalyst is left in the storage vessel 210, among other information available to the controller 280 regarding system activity. The memory device 262 may be in the form of a hard disk, a floppy drive, a compact disc, flash memory or other form of digital storage. In one embodiment, the processor 260 is a C-Engine processor manufactured by ADPI, located in Troy, OH.

At least a first communication port 250 is coupled through the intrinsically safe barrier 286 to the processor 260 and/or controller 280 to facilitate communication with a device outside the enclosure 280. For example, the first communication port 250 accessible from the exterior of the enclosure 280 may provide access to data stored in the memory device 262. The first communication port 250 may alternatively be utilized to communicate with the controller 280, for example, to revise the ladder logic stored in the PLC. In the embodiment depicted in FIG. 2, the first communication port 250 is coupled to a local device 256, such as a lap top computer or PDA, to access data stored in the memory device 262. The ability to extract and/or access catalyst consumption information and/or other data stored in the memory device 262 of the processor 260 from a local device 256 without having to unbolt the cover 272 from the enclosure 280 to access the memory device 262 eliminates the need for access authorization and the associated downtime involved with opening the enclosure 282.

The first communication port 250 may be a serial port or a parallel port having one or more conductors that penetrate the wall of the enclosure. For convenience, a standard RS-232-type jack that is configured for uses in this environment may be utilized. The first communication port 250 penetrates housing 270 or cover 272 of the enclosure 280 to enable data communications to occur with the controller while the enclosure 280 remains sealed. The processor 260 is programmed in a conventional manner to utilize the first communication port 250.

In the embodiment depicted in FIG. 2, a second communication port 252 may pass through the housing 270 or cover 272 of the enclosure 282. The second communication port 252 is coupled through the intrinsically safe barrier 286 to a modem 266. The modem 266 enables the processor 260 to communicate to a communications network such as a wide area network, thereby allowing the memory device 262 of the processor 260 to be accessed from a remote device 258 over fixed communication lines, such as a telephone line, ISDN, DSL, T1, fiber optic and the like. As such, the remote device 258 may be a computer terminal that interacts with the system 200 via the Internet. Alternatively, the modem 266 may facilitate wireless telephonic/data communication, i.e., the modem may be a wireless modem.

Figure 4:
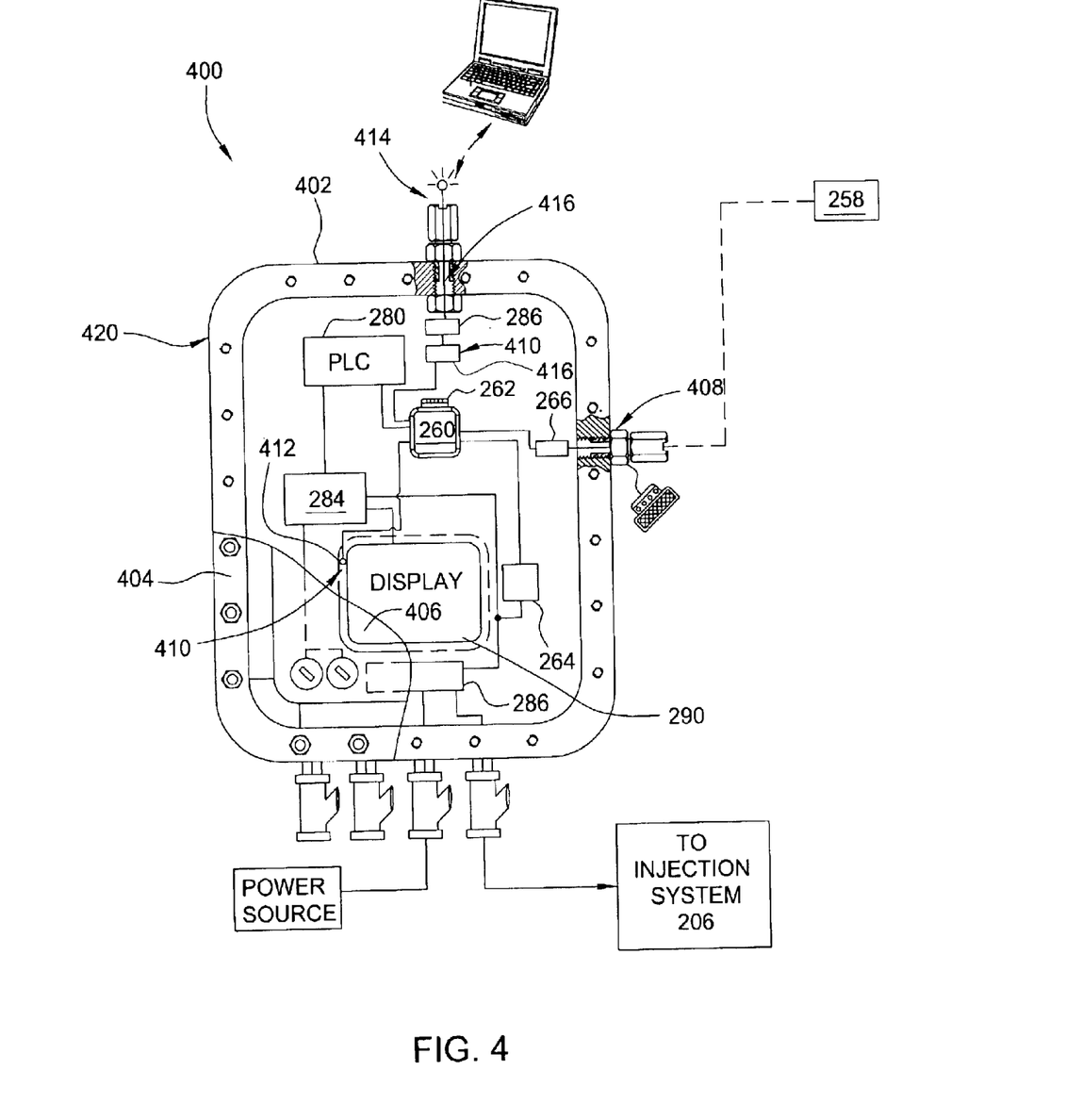
FIG. 4 is a simplified schematic view of another embodiment of a control module configured to provide local data access.

FIG. 4 is a simplified schematic of another embodiment of a control module 400 configured to provide local data access. The control module 400 generally includes a housing 402 and a cover 404 that define a hazardous duty enclosure 420 that houses a controller 280. The controller 280 is generally coupled to the injection system 206 through an intrinsically safe barrier 286 disposed in the enclosure 420.

The controller 280 is coupled to a processor 260 that manages a memory device 262 of the injection system. Local access to the memory device 262 is provided through a wireless transceiver 410 and a coupler 414 such as an antenna. The transceiver 410 is located within the enclosure 420 and is coupled through the intrinsically safe barrier 286 to an electrical connector 416 that penetrates the enclosure 420. The coupler 414 is coupled to the connector 416 on the outside of the enclosure 420 such that signals can be coupled between a remote device 256 and the processor 260 via the coupler 414. The remote device 256 may be a lap top computer or PDA that is brought within communication range the coupler 414. The communication between the remote device 256 and the transceiver 410 may be accomplished using, for example, a standard IEEE 802.11 protocol or some other wireless data communications protocol.

Alternatively, the coupler 414 may be disposed within the enclosure 420 such that signals can be coupled to and from a remote device 256 through a material transmissive to the signal comprising at least a portion of the enclosure 420. For example, the signal may pass through a window 406 formed in the enclosure 420, shown disposed in the cover 404 in FIG. 4. Alternatively, at least one of the housing 402 or cover 404 of the enclosure 420 may be at least partially fabricated from the material transmissive to the signal between the remote device 256 and the transceiver 410.

In another embodiment, the transceiver 410 may be an optical transceiver 412 positioned within the enclosure 420 and the coupler 414 may be an opto-coupler. As such, information may be "beamed" through the window 406, dispose disposed in the cover 404. Optionally, the control module 400 may additionally include a second communication port 408 accessible from the exterior of the enclosure 420 that is coupled to the processor 206 via a modem 266.

Although the injection system 206 described above is shown configured to provide catalyst from a single storage vessel 210, the invention contemplates utilizing one or more injection systems coupled to the FCC unit 202 to introduce multiple catalysts from a plurality of storage vessels, each of which may be controlled by common or independent control modules.

Figure 5:
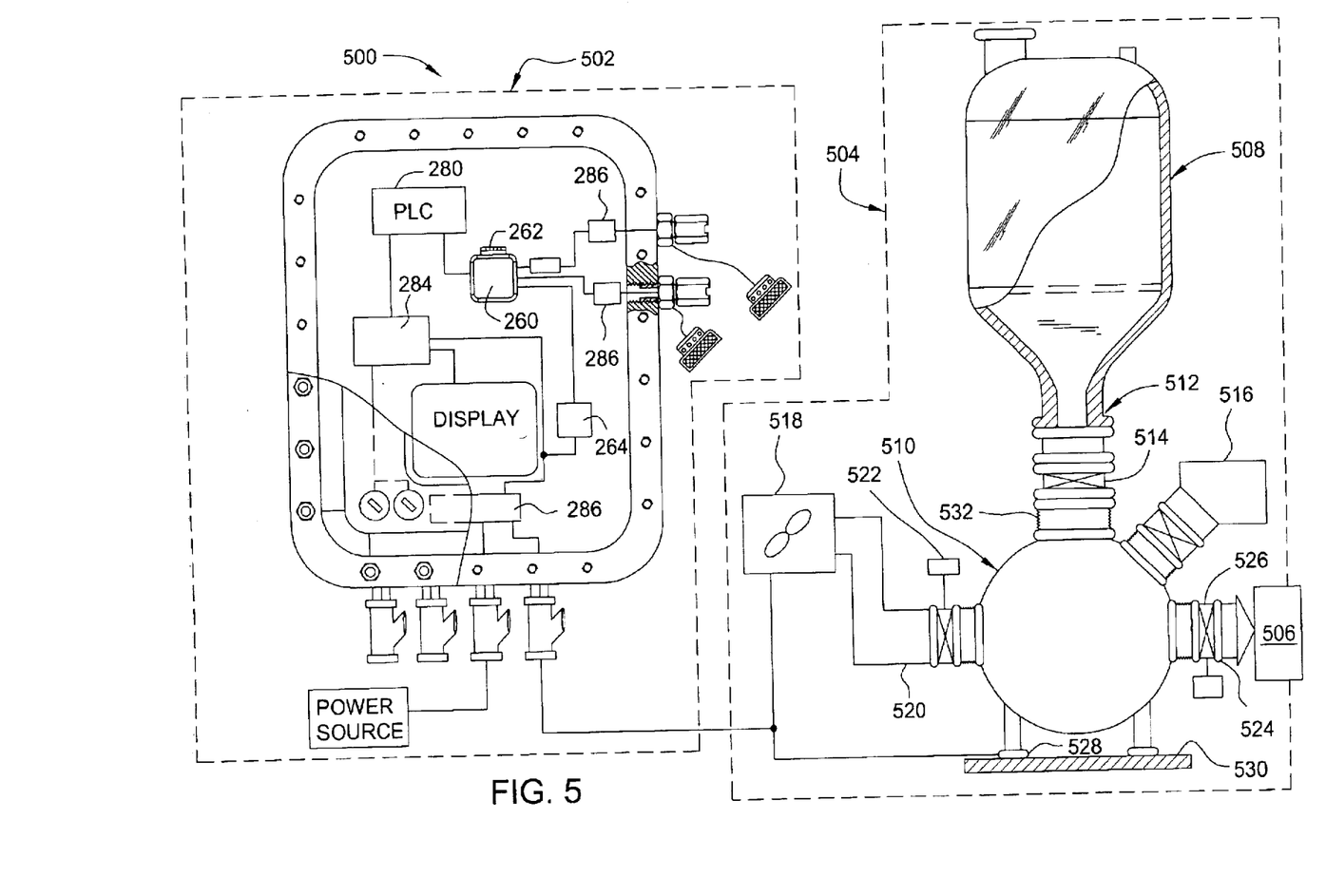
FIG. 5 is a simplified view of another embodiment of an injection system.

FIG. 5 is a simplified view of another embodiment of an injection system. The system 500 includes a control module 502 for controlling a catalyst injection system 504 coupled to an FCC unit 506. The controller 502 is substantially similar to the control modules described above.

The injection system 504 includes a bulk storage vessel 508 and a shot pot 510. The storage vessel 508 is generally adapted to store catalyst therein at substantially atmospheric pressures. A discharge port 512 of the storage vessel 504 is coupled by a shut-off valve 514 to the shot pot 510. The shut-off valve is periodically selectively opened to fill the shot pot 510 with catalyst. Once the shot pot 510 is filled with a pre-defined amount of catalyst, the shut-off valve 514 is closed, and the shot pot 510 is pressurized by a pressure control system 516 that elevates the pressure of the catalyst and gases within the shot pot 510 to a level that facilitates injection of the catalyst into the FCC unit 506, typically at least about 10 pounds per square inch.

A fluid handler 518 is coupled to the shot pot 510 by a first conduit 520. The first conduit 520 includes a shut-off valve 522 that selectively isolates the fluid handler 518 from the shot pot 510. A second conduit 524 couples the shot pot 510 to the FCC unit 506 and includes a second shut-off valve 526 that selectively isolates the shot pot 510 from the FCC unit 506. Once the shot pot 510 is filled with catalyst and the shut-off valve 514 is closed, the shot pot 510 is brought up to pressure and the shut-off valves 522, 526 are opened to facilitate movement of the catalyst from the shot pot 510 to the FCC unit 506 by air delivered through the shot pot 510 by the fluid handler 518.

The weight of the shot pot 510 is monitored to control the amount of catalyst dispensed into the shot pot 510 from the storage vessel 508. A plurality of load cells 528 are typically coupled between the shot pot 510 and a mounting surface 530 to provide the control module 502 with a metric indicative of the weight of the catalyst and shot pot 510 which may be utilized to resolve the amount of catalyst in the shot pot 510. In order to provide the necessary isolation of the shot pot 510 from its surrounding components needed to obtain accurate data from the load cells 528, a plurality of bellows 532 are coupled between the shut-off valves 514, 522, 526 and the pressure control system 516. The bellow 532 allow the shot pot 510 to move independently from the conduits and other components coupled thereto so that substantially all of the weight of the shot pot 510 and catalyst disposed therein is borne on the load cells 528.

Thus, an injection system has been provided that facilitates remote communication with a control module of the system. In one embodiment, the inventive system allows data residing in a memory device disposed in the control module to be accessed without compromising the safety device of an enclosure housing the memory device. In another embodiment, communication may be remotely established with the system's controller.

Although the teachings of the present invention have been shown and described in detail herein, those skilled in the art can readily devise other varied embodiments that still incorporate the teachings and do not depart from the scope and spirit of the invention.

What is claimed is:

1. A system for injecting catalyst into a fluid catalyst cracking unit, comprising:
   a catalyst injection apparatus for providing catalyst to a fluid catalyst cracking unit;
   an enclosure suitable for hazardous service;
   a controller disposed in the enclosure for controlling the additions made by the catalyst injection apparatus; and
   a communication port coupled to the controller for communicating information regarding activity of the catalyst injection apparatus to a device remote from the enclosure while the enclosure is sealed.

2. The system of claim 1, wherein the information is at least one of an amount of catalyst injected into the fluid catalyst cracking unit, error messages from the controller, a record of operator interface with the controller, times of manually interrupting, times of program resumption, additions that are made manually which are in addition to any automatically controlled additions, and an hourly weight record of how much catalyst is left in the catalyst injection system.

3. The system of claim 1, wherein the catalyst injection apparatus further comprises:
   at least one sensor for providing a metric indicative of catalyst dispensed into the fluid catalyst cracking unit.

4. The system of claim 3, wherein the catalyst injection apparatus further comprises:
   a storage vessel; and
   a metering device coupled to the storage vessel and having an output adapted for coupling to the fluid catalyst cracking unit.

5. The system of claim 3, wherein the metering device comprises at least one of a shut-off valve, a rotary valve, a mass flow controller, a shot pot, a flow sensor or positive displacement pump.

6. The apparatus of claim 3, wherein the metering device further comprises:
   a shot pot adapted to measure a predetermined volume or predetermined weight of catalyst.

7. The apparatus of claim 6, wherein the metering device comprises:
   at least one load cell adapted to detect a metric indicative of an amount of catalyst in the shot pot.

8. The apparatus of claim 1, wherein a catalyst injection system further comprises:
   a sensor adapted to detect a metric indicative of a change in the amount of catalyst disposed in the storage vessel.

9. The system of claim 8, wherein the sensor comprises at least one of a load cell or level transducer.

10. The system of claim 1, wherein the catalyst injection apparatus further comprises:
    a storage vessel;
    a valve body having a first port coupled to an aperture of the storage vessel;
    a second port adapted for coupling to the fluid cracking unit; and
    a third port adapted for coupling to a fluid supply.

11. The system of claim 10, wherein the valve body further comprises:
    a passage formed between the second and third port;
    a cavity having the first port disposed at one end and a valve seat disposed at a second end;
    an orifice disposed through the valve seat and coupling the cavity to the passage; and
    a shear disk disposed in the cavity and selectively sealing the orifice, the shear disk adapted have a precessional motion while moving over the valve seat.

12. The system of claim 1, wherein the communication port comprises at least one of a serial port or a parallel port.

13. The system of claim 1, wherein the communication port comprises a wireless transceiver.

14. The system of claim 1, wherein the communication port comprises an optical transceiver.

15. The system of claim 1, wherein the communication port is coupled to the remote device through a window disposed in the enclosure.

16. The system of claim 1, wherein the communication port is coupled to a processor disposed in the enclosure, the processor having a memory device.

17. The system of claim 16, wherein the memory device is at least one of flash memory, a disk drive, a hard disk, a compact disc, or a digital storage device.

18. The system of claim 1, wherein the controller further comprises:
    a modem coupled to the controller.

19. The system of claim 18, wherein the modem is coupled to the communication port.

20. The system of claim 18, wherein the modem is coupled to a second communication port accessible from the exterior of the enclosure and sealably coupled to the controller.

21. The system of claim 1, wherein the controller further comprises:
    a programmable logic controller having a data port coupled to the communication port.

22. The system of claim 1, wherein the communication port is accessible from an exterior of the enclosure while the enclosure is sealed.

23. A system for injecting catalyst into a fluid catalyst cracking unit, comprising:
    a storage vessel;
    a metering device coupled to the storage vessel and having an output adapted for coupling to the fluid catalyst cracking unit;
    at least one sensor for providing a metric indicative of the amount of catalyst dispensed into the metering device;
    an enclosure suitable for hazardous service;
    a controller disposed in the enclosure and having a memory device for storing catalyst injection information derived from the metric provided by the sensor; and
    a communication port coupled to the controller for communicating information stored in the memory device to a remote device while the enclosure is sealed.

24. The apparatus of claim 23, wherein the communication port is at least one of a serial port, a parallel port, a wireless broadcast transmitter or an optical transmitter.

25. The system of claim 23, wherein the communication port is an optical transmitter positioned to be viewed through a window disposed in the enclosure.

26. The system of claim 23 further comprising a modem coupled between the communication port and the controller.

27. The system of claim 23, wherein the memory device is at least one of flash memory, a disk drive, a hard disk, a compact disc or a digital storage device.

28. The system of claim 23, wherein the metering device further comprises:
    a valve body having a first passage teed with a second passage;

a valve seat having the first passage extending therethrough; and a shear disk disposed in the valve body and selectively moving over the valve seat in a precessional motion.

29. A method for injecting catalyst into a fluid catalytic cracking unit, comprising;

dispensing catalyst for a catalyst injection system into a fluid catalytic cracking unit;

storing a record of system activity indicative of the amount of catalyst in a memory device disposed in an enclosure suitable of hazardous duty; and accessing via wireless communication the stored record from the enclosure while the enclosure remains sealed.

30. The method of claim 29, wherein the record is indicative of the amount of catalyst dispensed.

31. The method of claim 29, wherein the step of accessing the stored record further comprises:

communicating with a remote device through a port disposed in the enclosure.

32. The method of claim 29, wherein the step of accessing the stored record further comprises:

communicating with a remote device through a modem disposed in the enclosure.

33. The method of claim 29, wherein the step of accessing the stored record further comprises:

communicating through a wireless transceiver disposed in the enclosure.

34. The method of claim 33, wherein the step of communicating further comprises broadcasting a signal from an antenna disposed on an exterior of the enclosure.

35. The method of claim 29, wherein the step of accessing the stored record further comprises:

communicating through an optical transceiver disposed in the enclosure.

* * * * *

UNITED STATES PATENT AND TRADEMARK OFFICE
CERTIFICATE OF CORRECTION

PATENT NO. : 7,050,944 B2
APPLICATION NO. : 10/304670
DATED : May 23, 2006
INVENTOR(S) : Evans Page 1 of 1

It is certified that error appears in the above-identified patent and that said Letters Patent is hereby corrected as shown below:

In Column 10, line 4, in Claim 11, after "adapted" insert - - to - -.

In Column 11, line 6, in Claim 29, after "comprising" delete ";" and insert - - : - -, therefor.

Signed and Sealed this

Fifteenth Day of August, 2006

JON W. DUDAS
*Director of the United States Patent and Trademark Office*